(12) United States Patent
Visalli et al.

(10) Patent No.: US 6,933,863 B2
(45) Date of Patent: Aug. 23, 2005

(54) PROCESS AND DEVICE FOR REDUCING BUS SWITCHING ACTIVITY AND COMPUTER PROGRAM PRODUCT THEREFOR

(75) Inventors: Giuseppe Visalli, Messina (IT); Francesco Pappalardo, Paterno (IT)

(73) Assignee: STMicroelectronics S.r.l., Agrate Brianza (IT)

(*) Notice: Subject to any disclaimer, the term of this patent is extended or adjusted under 35 U.S.C. 154(b) by 76 days.

(21) Appl. No.: 10/617,147

(22) Filed: Jul. 9, 2003

(65) Prior Publication Data
US 2004/0201505 A1 Oct. 14, 2004

(30) Foreign Application Priority Data
Jul. 10, 2002 (EP) .............................. 02425456

(51) Int. Cl.[7] .................................. H03M 5/00
(52) U.S. Cl. ..................... 341/55; 341/50; 370/466
(58) Field of Search ................... 341/50, 55, 141, 341/106; 370/388, 362, 466, 467

(56) References Cited

U.S. PATENT DOCUMENTS 5,651,126 A    7/1997   Bailey et al. ............... 395/401
6,456,620 B1 * 9/2002   Wang et al. ................ 370/388
6,456,838 B1 * 9/2002   Wang et al. ................ 370/380

FOREIGN PATENT DOCUMENTS

EP     0 189 202 A2   7/1986
WO     WO 02/39290 A2 5/2002

* cited by examiner

Primary Examiner—John Nguyen
(74) Attorney, Agent, or Firm—Lisa K. Jorgenson; Seed IP Law Group PLLC; Dennis M. de Guzman

(57) ABSTRACT

A process for transmitting data on a bus, minimizing the switching activity, involves converting the data between a first format and a second format used for transmission of the data. The conversion between said first format and said second format entails the swapping of position of respective bits within a cluster comprising a given number of bits, the swap operation being implementable according to different variants, the maximum number of said variants being equal to the factorial of the aforesaid given number. Each of said variants is identified by a respective pattern. Among the aforesaid patterns, an optimal pattern is selected which minimizes the switching activity at the moment of transmission of data on the bus. The data are then transmitted on the bus using the second format generated using said optimal pattern.

40 Claims, 4 Drawing Sheets

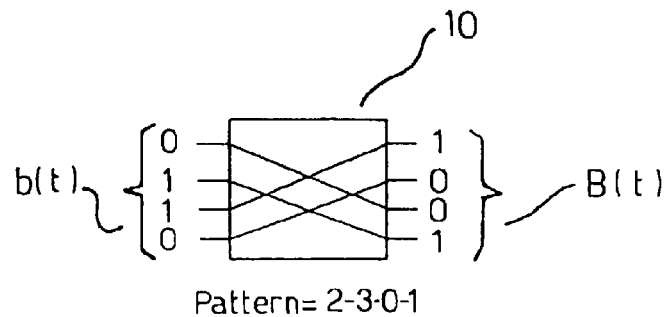
Fig_1
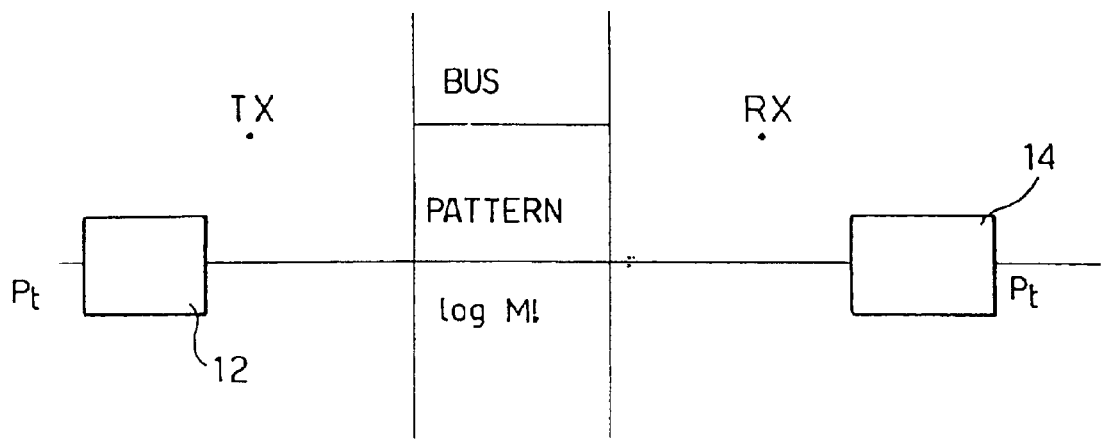
Fig_2
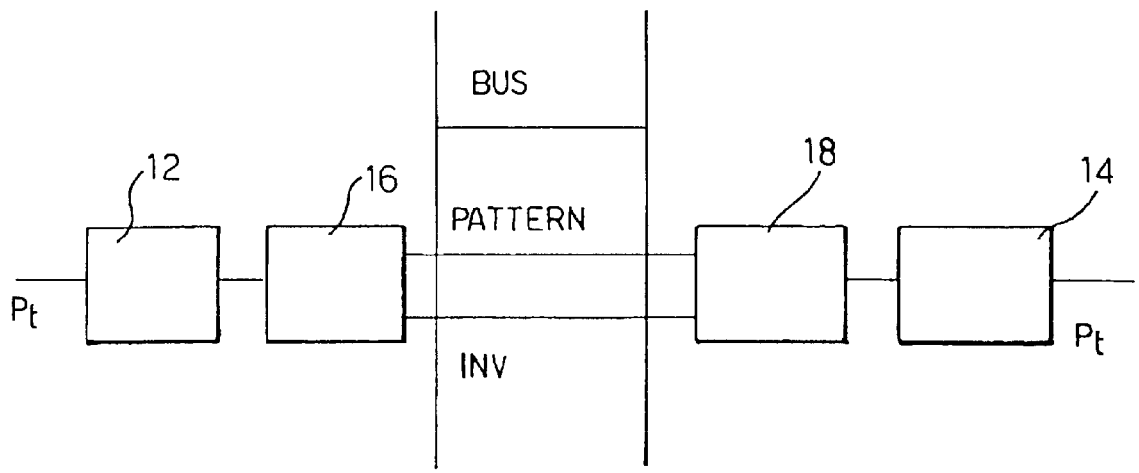
Fig_3

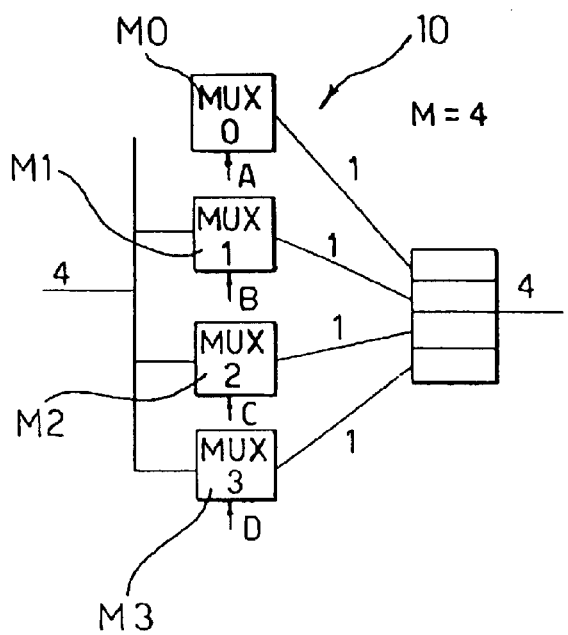
Fig_4
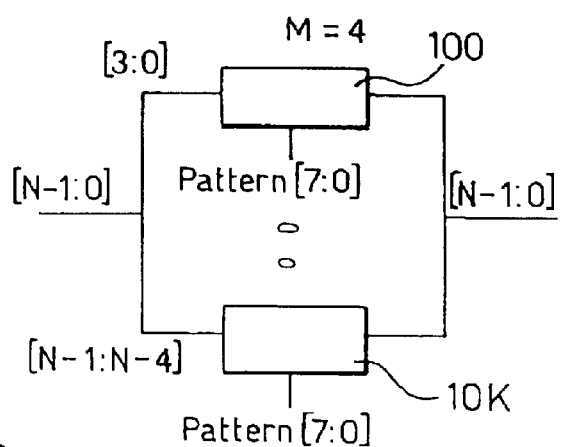
Fig_5
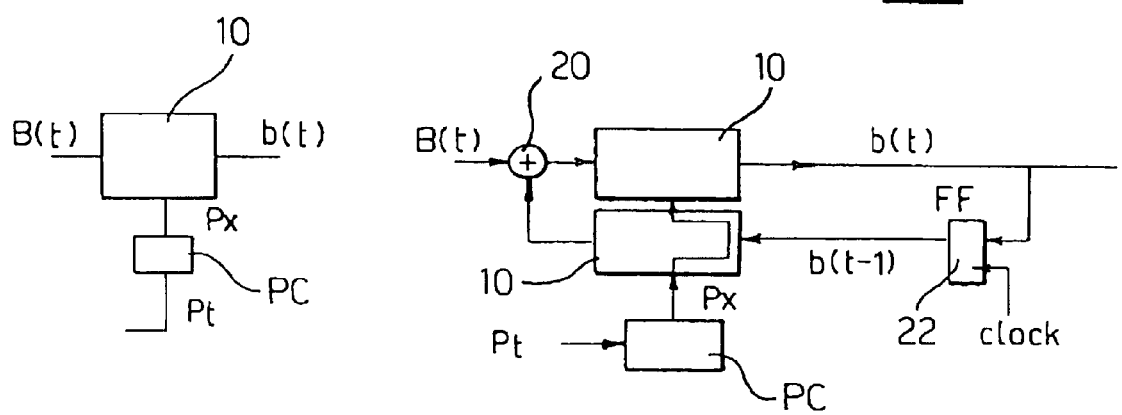
Fig_6
Fig_7

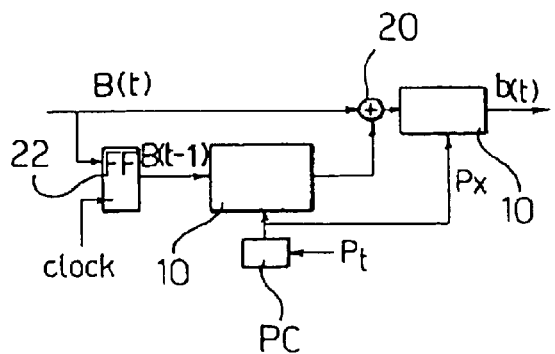
Fig_8
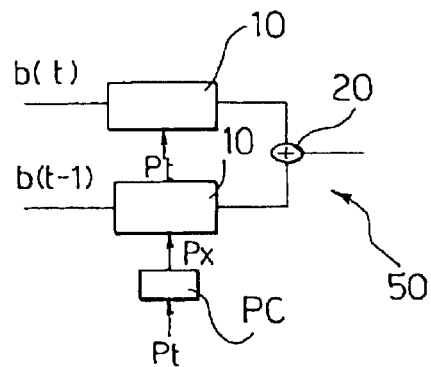
Fig_9
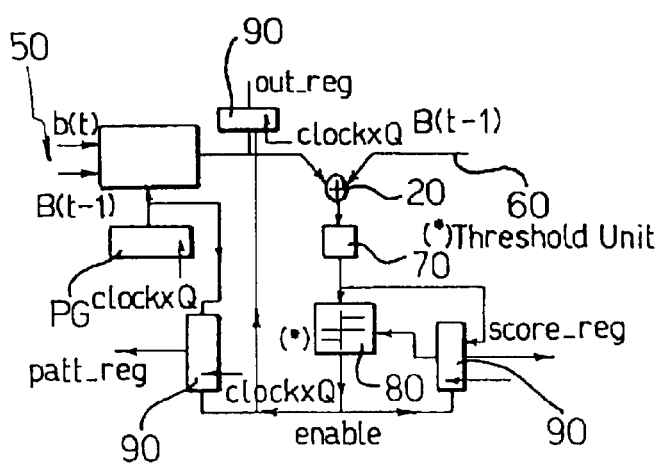
Fig_10
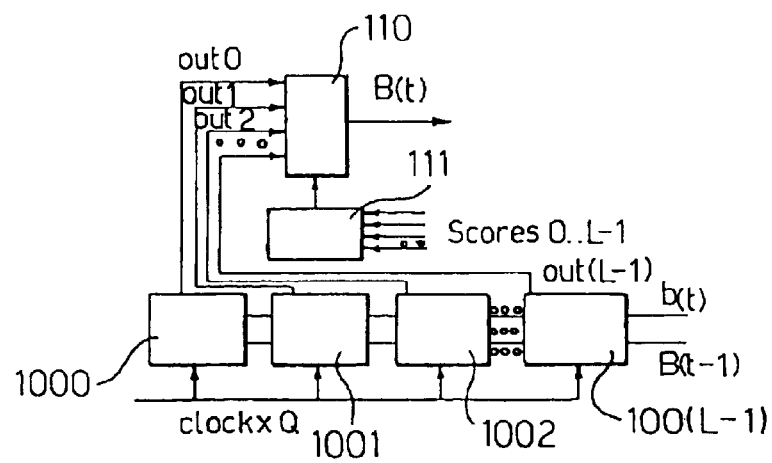
Fig_11

Fig_12
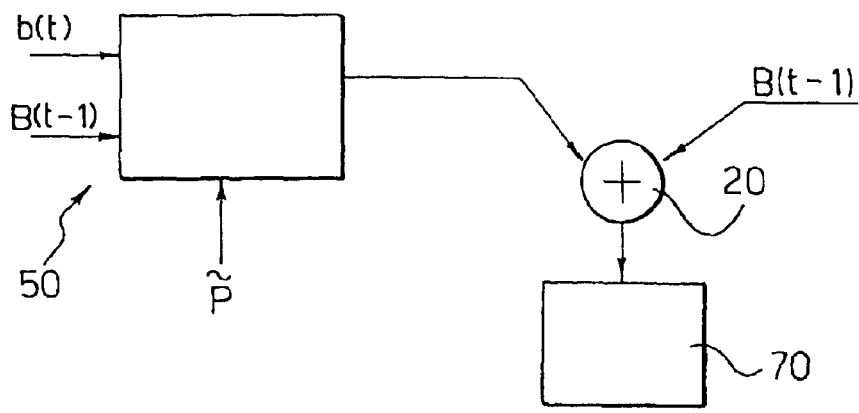
Fig_13
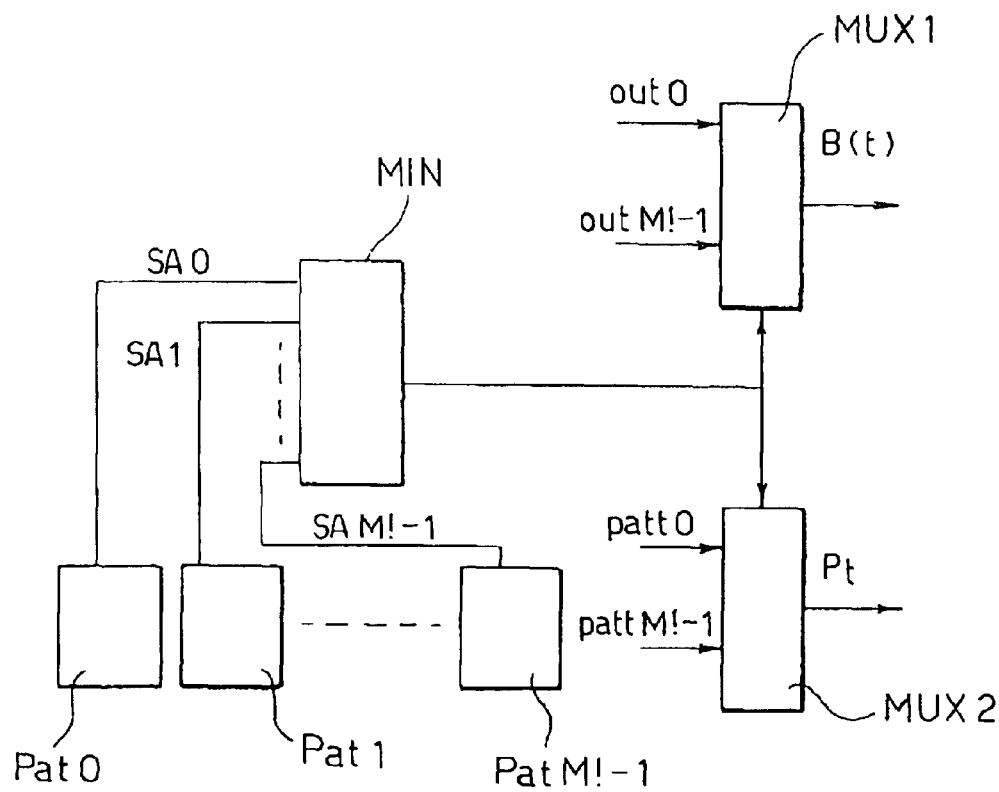

PROCESS AND DEVICE FOR REDUCING BUS SWITCHING ACTIVITY AND COMPUTER PROGRAM PRODUCT THEREFOR

BACKGROUND OF THE INVENTION

1. Field of the Invention

The present disclosure relates to techniques for controlling switching activity (SA) on buses, both of a wide type and of a narrow type.

2. Description of the Related Art

The reduction in the total switching activity on buses is a subject to which extensive research activity has been dedicated, the chief aim being to reduce power absorption and in general to prevent negative phenomena linked to the capacitive behavior of the physical structure of the bus.

One technique that is frequently used is to encode the flow of input data with a law of reversible encoding and hence one that enables decoding.

The technique currently known as the "bus-inverted" (BI) technique is the one most widely used, both on account of its ease of implementation and on account of the good performance, above all in the case where the total number of lines of the bus is small. This procedure is also useful in the case of asynchronous buses.

BRIEF SUMMARY OF THE INVENTION

One embodiment of the present invention provides an improved solution for reducing the switching activity on buses.

According to an embodiment the present invention, the said solution is achieved thanks to a process having the characteristics referred to specifically in the claims that follow. One embodiment of the invention also regards the corresponding device, as well as a computer product that can be loaded directly into the memory of a digital processor associated to a bus, the computer product comprising portions of software code for implementing the process when the computer product is run on a processor associated to a bus.

The solution according to one embodiment of the invention is based on the solution of switching the input lines on the bus of a particular sorting pattern. The best pattern is chosen so as to give rise to a minimum value of difference (in terms of switching activity) between the transmission currently in progress B(t) and the preceding transmission B(t−1).

BRIEF DESCRIPTION OF THE SEVERAL VIEWS OF THE DRAWINGS

Embodiments of invention will be now be described, purely by way of non-limiting example, with reference to the attached drawings, wherein:

FIG. 1 illustrates, in general terms, the criteria of operation of a functional module that can be used in the framework of an embodiment of the invention;

FIGS. 2 and 3 are additional functional-block diagrams, which illustrate the transmission of the information inherent in the operation of the block illustrated in FIG. 1;

FIGS. 4 and 5 illustrate possible schemes of implementation of functional blocks that can be used in the framework of an embodiment of the invention;

FIGS. 6 to 8 are various block diagrams of receivers that can be used in the framework of an embodiment of the invention;

FIGS. 9 to 11 illustrate, in a complementary way, corresponding transmitter structures; and FIGS. 12 and 13 illustrate further advantageous developments of an embodiment of the invention.

DETAILED DESCRIPTION OF SOME EMBODIMENTS OF THE INVENTION

Embodiments of a process and device for reducing bus switching activity and computer program product therefor are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A solution according to an embodiment of the invention is based upon the use of a swap operator 10 operating according to the criteria illustrated in FIG. 1.

In what follows, the flow of data at input to the operator 10 at the instant t will be designated by b(t), whilst the corresponding data flow at output will be designated by B(t). $P_t$ will identify, in general, the sorting pattern implemented by the swap module or block designated as a whole by 10.

If the data flows are represented by $N=2^n$ bits, the sorting pattern $P_t$ is represented by N digits of n bits each. The individual values that the sorting pattern can assume are only N! (N factorial).

In the specific case represented in FIG. 1, the input data flow b(t) is represented by 0110, whilst the output flow B(t) is represented by 1001.

The sorting pattern (referring to the positions of the input and output bits numbered 0, 1, 2, 3) has the expression 2-3-0-1.

In other words, the pattern 2-3-0-1 means that:

the input bit of position 0 becomes the output bit of position 2;

the input bit of position 1 becomes the output bit of position 3;

the input bit of position 2 becomes the output bit of position 0; and the input bit of position 3 becomes the output bit of position 1.

In more general terms, the swap module can be expressed as an operator to which there applies a relation of the type $$B(t)=S(b(t), P_t).$$

The swap operator admits, in general, of an inverse function $S^{-1}$, such that $$b(t)=S^{-1}(B(t), P_t).$$

The direct and inverse swap operations can be implemented using the same function, by applying two different patterns linked by a biunique relation $b(t)=S^{-1}(B(t), P_t)=S(B(t), P_t^{-1})$.

From the above, it can be understood that, given an input data flow b(t), it is possible to make N! attempts at measuring the switching activity (SA) between the preceding output data flows B(t−1) and a given "current" attempt function B˜(t).

For example, measurement of the switching activity SA can be expressed resorting to the Hamming distance applied to the function of exclusive or between B(t−1) and B˜(t).

$\min_{p^-} SA(p^-) = \min_{p^-} H[B(t-1) \oplus B^-(t)] \Rightarrow P_t$.

There are various degrees of freedom for the choice of B˜(t), but the function depends specifically upon the currently present input b(t) and the current pattern $P_t$.

The transmitter entrusted with the function of transmitting the output bits on the bus can hence generate the output after having made N! attempts and using finally the pattern $P_t$ which gave rise to the minimum switching activity.

However, if N is not small, the number of attempt steps required becomes very high, and this fact forces the transmitter in question to operate at a frequency that is much higher than that of the bus clock.

It follows that this technique, which is in itself functional, can be used in a way that is altogether satisfactory only with a bus with a rather slow clock.

In order to overcome this drawback, it is possible to operate with a subset of allowed patterns and use a parallel processing, which increases the area on silicon occupied by the transmitter. Moreover, if the value of N is high, the number of bits representing the pattern $P_t$ grows exponentially.

It is, however, possible to split a wide bus of N bits into a subset of narrow buses, each operating on M bits, with M much smaller than N. For the various narrow buses, it is then possible to use the same pattern and select the optimal pattern according to the minimum total switching activity, where by total is, of course, meant the switching activity on all of the N/M buses.

In order to be able to recover the received data correctly, the pattern $P_t$ must be transmitted by the module that acts as transmitter to the module which functions as receiver with respect to the transmission of the data on the bus.

The lines used for driving the swap module (again taking as reference the swap module 10 of FIG. 1) which represents the pattern are $M \cdot \log_2 M$, where it may readily be assumed that M (depth of the cluster) is a power of two.

A number of lines of this sort is, in actual fact, redundant, in so far as it is necessary to represent only M! different states. During transmission, the patterns can hence be compressed on the number of lines strictly necessary for representing M! different values. It follows that the number of additional lines necessary for this purpose is given by the first integer higher than $\log_2 M!$.

Before using the swap unit, the decoder decompresses on $M \cdot \log_2 M$ bits the input lines representing the pattern.

The modules which implement the compression/decompression function can be configured as simple combinatorial logic networks which are designed to implement a truth table and do not include flip-flops.

FIG. 2 is a schematic illustration, in the form of a block diagram, of the logic used for transmitting and receiving the information regarding the pattern carried on special additional bus lines.

In the diagram of FIG. 2, the references TX and RX designate, respectively, the transmission end and the reception end with respect to the bus.

The reference number 12 designates a compressor module which, at the transmitter TX end, compresses the representative bits of the pattern $P_t$ on $M \cdot \log_2 M$ bits necessary for transmitting the pattern on the number of lines identified by the first integer higher than $\log_2 M!$. The reference number 14 designates instead a decompression module which, at the receiver RX end, reconstructs the pattern $P_t$.

For the transmission of the pattern data on the additional lines, it is possible to use to advantage the bus-inverted technique. The reduction in the switching activity which can be achieved using the bus-inverted technique with few lines is approximately 60–70% of the total switching activity. Of course, instead of the bus-inverted technique (BI), it is possible to use other techniques that are able to reduce the switching activity of the lines that are to transmit the pattern.

The application of the bus-inverted technique to the context of FIG. 2 is represented in FIG. 3. Here parts or elements that are identical or equivalent to the ones already described with reference to FIG. 2 are designated by the same reference numbers.

In addition to the elements represented in FIG. 2, FIG. 3 represents two further modules 16 and 18, designed for the bus-inverting function, respectively in the transmission stage (module 16) and the receiving stage (module 18), with respect to the additional lines of the bus.

Previously, it has been explained that there exist different degrees of freedom for choosing the attempt function B˜(t). In actual fact, the decoding process is not always simple to perform and, in some cases, is in practice impossible.

In what follows, a number of examples of the attempt function are presented which are suitable for being used in a particularly advantageous way whether on account of their simple form or because they enable convenient decoding $$B^-(t)=S(b(t), p^-); \qquad\qquad \text{I.}$$

$$B^-(t)=S(b(t), p^-)\oplus S^{-1}(b(t-1), p^-); \qquad\qquad \text{II.}$$

$$B^-(t)=S(b(t), p^-)\oplus S^{-1}(B(t-1), p^-). \qquad\qquad \text{III.}$$

B˜(t) represents a possible output value of the transmitter obtained by applying the attempt pattern ($P_t$) designated by p˜, to the swap operators. It will be appreciated that when p˜ becomes the optimal attempt pattern, $P_t$, then B(t)=B˜(t).

This explains why, in the present description, the role of p˜ is, in effect, at times confused with $P_t$.

The tests conducted by the present applicant simulating the transmission on a 32-bit bus of files of different types (Latex, Spice, GCC, JPEG, MP3 and AVI) show—with reference to a cluster depth M of 4 and with the use of all twenty-four possible patterns—an appreciable improvement over the performance that can be achieved, in terms of reduction in switching activity SA, with the use of the bus-inverted technique.

For instance, with reference to the files considered previously, the percentage reduction in the switching activity that can be achieved using the bus-inverted technique was found to be between 0% and 10.64%.

Using the first function I seen previously, the reduction was found to be between 2.74% and 14.56%. Using the function designated by II, the reduction obtained was between 3.3% and 17.72%. Again, using function III, a reduction of between 15.5% and 23.16% was found.

It should be emphasized that, in the case of functions I, II and III, in the evaluation also the switching activity produced by the additional lines used for the transmission of the pattern Pt was taken into account.

If a sub-set is considered of allowed patterns chosen by analyzing the mean traffic and selecting the best pattern, a reduction in the number of additional lines is obtained. At the same time, the fact of reducing the allowed patterns as compared to an ideal solution which leads to a reduction in coverage, with a consequent degradation of performance in overall terms.

More specifically, the results show that the gain in terms of reduction in switching activity SA cannot be appreciable in the event of a pattern subset being chosen, without following a precise criterion.

If the choice of allowed patterns is governed by means of test files and the recurrences of the best patterns are measured starting from the original algorithm, different results are obtained.

For example, with N=32 and M=4, from a comparison between the performance of 4-bit, 8-bit, 16-bit, and 24-bit (complete) patterns using a Spice file, the best performance is seen to be obtained using 16 patterns.

With reference to the results obtained previously, it may be noted that the data reported with reference to functions I, II and III can be improved even further with reference to given files using the sixteen best patterns by means of analysis of the mean traffic, even though for other files, resorting to this solution does not lead to an improvement, but rather to a slight worsening in performance as compared to the performance cited previously.

Notwithstanding what has just been said, function III continues to yield by far the best performance in terms of reduction in switching activity.

It is also interesting to note that an improvement in terms of performance may depend upon the width of the bus in one embodiment. For instance, if the results that can be achieved using the bus-inverted technique are compared with the results that can be achieved using function III considered previously, it is found that for a bus having eight lines, the two solutions yield practically equivalent results. On buses having 32 and 40 lines, the performance that can be achieved using function III leads to a reduction in switching activity that is practically twice the reduction that can be achieved using the bus-inverted technique. In the case of a bus of 64 lines, function III seen previously leads to a reduction in switching activity that is practically three times the performance that can be achieved using the bus-inverted technique. The results reported, which are on the other hand to be interpreted in a substantially qualitative sense, refer to a Spice file.

The diagram of FIG. 4 shows a simple implementation of the swapping module 10 of FIG. 1. The implementation illustrated is designed to operate on just one cluster and envisages the use of M multiplexers (four in all designated by M0, M1, M2, M3 in the example illustrated). The multiplexers in question receive at input the signal b(t) and carry out the switching governed by the pattern so as to give rise to the signal B(t).

The said function can be represented as follows:
A=Pattern [1:0];
B=Pattern [3:2];
C=Pattern [5:4]; and
D=Pattern [7:6].

The diagram of FIG. 5 shows how it is possible to obtain a structure that is able to operate on a bus with a number of lines equal to M, where M is assumed as being a rather high number. In this case, the solution described involves using K modules of the type seen previously designated by 100, . . . , 10K.

In other words, this solution corresponds to having divided ideally a wide bus (on M lines) into N narrow buses, each of which comprises M/N lines. This approach means that the selection attempts of the optimal pattern to be implemented on the various narrow buses are much smaller in number than the ones that should be implemented on the wide bus (with M lines). As has been said, it is in particular possible to proceed in such a way that for all the narrow buses there is used a single pattern chosen as the pattern that minimizes the total switching activity for the bus.

As has been described previously, the direct and inverse swap operation can be obtained using the same module but with different input patterns. If $P_t$ represents the direct swapping operation, there always exists a new pattern $P_x = P_t^{-1}$, which provides the inverse swap operation.

$$S(b(t), P_t) = S^{-1}(b(t), P_t^{-1}) = S^{-1}(b(t), P_x), \forall b(t).$$

$P_x$ and $P_t$ are linked by a biunique relation, whereby it is possible to use a combinatorial network to obtain $P_x$ from $P_t$.

For instance, the table given below shows different values of $P_t$ and $P_x$ for M=4, so as to clarify how the aforementioned combinatorial network is to be obtained.

| $P_t$ | $P_x$ |
|---|---|
| 1-2-3-0 | 3-0-1-2 |
| 1-0-2-3 | 1-0-2-3 |
| 2-1-3-0 | 3-1-0-2 |
| 0-1-3-2 | 0-1-3-2 |
| 2-1-0-3 | 2-1-0-3 |
| 1-3-0-2 | 2-0-3-1 |

As a possible alternative, such a module—which can be defined simply as pattern converter (PC)—can be implemented in the form of a look-up table (LUT).

The diagrams of FIGS. 6, 7 and 8 illustrate the possible implementation of the swapping laws I, II and III seen previously with the use of a pattern converter PC to the input of which there is sent the information identifying the pattern $P_t$, which has for example been received from the output of the decompressor module 14 illustrated in FIGS. 2 and 3.

In the case of function I and, in particular, of its inverse function, namely $$B(t) = S(b(t), P_t)$$

$$b(t) = S(B(t), P_x)$$

the implementation envisages the presence of a single module 10 of the type seen previously together with the pattern converter PC.

In the case of function II and, in particular, of its inverse function, namely $$B(t) = S(b(t), P_t) \oplus S^{-1}(b(t-1), P_t)$$

$$b(t) = S[S(b(t-1), P_x) \oplus B(t)), P_x]$$

the use of two modules 10 is envisaged, which are connected by means of an adder (exclusive OR) node 20 and a flip-flop 22 driven by a clock signal.

The flip-flop 22 is designed to generate, starting form the output signal b(t) a retarded replica b(t−1) which, supplied to one of the modules 10, produces a signal that is to be added (once again, exclusive OR), in the adder node 20, to the signal B(t). The signal deriving from the addition made in the node 20 is supplied to the other module 10 to generate the output signal b(t).

The diagram of FIG. 8 implements, instead, function III seen previously; i.e., $$B(t) = S(b(t), P_t) \oplus S^{-1}(B(t-1), P_t)$$

$$b(t) = S[(S(b(t-1), P_x) \oplus B(t)), P_x]$$

Also in this case, in addition to two swap modules 10 an adder (EX-OR) node 20 and a flip-flop 22 driven by a clock signal are present. In this case, the flip-flop 22 is used to generate a retarded replica, designated by B(t−1), of the input signal B(t). The aforesaid retarded replica is sent to the first module 10, which receives at input the signal $P_x$ produced by the pattern converter PC for generating a signal that is to be added, in the node 20, to the signal B(t). The result of the addition made in the node 20 is supplied to the other node 10 to produce the output signal b(t) as a function of the pattern $P_x$.

It will be appreciated that in all the circuits referred to above there are no sequential elements, so that the output is presented with the single delay determined by the modules 10.

For simplicity of exposition, it has been preferred to illustrate first, with reference to FIGS. 6 and 8, some possible embodiments of the receiver, i.e., of the circuit which, starting from the signal B(t) reconstructs the signal b(t).

There remain to be illustrated the possible embodiments of the architecture of the transmitter, i.e., of the circuit that generates the signal B(t) starting from the signal b(t).

The cluster depth is here still assumed as being equal to M, so that the total number of patterns allowed continues to be equal to M! units.

It should moreover be noted that operating with a subset of allowed patterns, chosen via an analysis of the mean traffic, the performance of the system does not undergo any degradation.

The main problem in the transmission stage is that of not working with frequencies that are far higher than the clock frequency of the bus. A possibility of optimization is afforded by the use of a certain degree of parallelism in the architecture of the transmitter.

For instance, for the case of functions II and III seen previously (for function I the case is trivial in so far as the transmitter is in effect identical to the receiver of FIG. 6), it is possible to use the diagram represented in FIG. 9, where the reference numbers 10 designate the swap modules of the type already described and the references PC and 20 designate, respectively, the pattern converter and an adder node (once again, having an EX-OR function).

The set of modules represented in FIG. 9, designated as a whole by 50, can be integrated in the more complex system represented in FIG. 10.

The diagram illustrated here represents a transmitter structure capable of performing the calculation of the Hamming distance between the old output B(t−1), presented on a line 60, and the attempt function B˜(t) calculated from the current values of the input b(t) and of the pattern $P_r$.

If the cluster depth is M, the module must make M! attempts.

As has already been mentioned repeatedly, it is possible to use a basic unit which makes a number of attempts Q smaller than M! by resorting to an implementation with a level of parallelism (M!)/Q.

The module designated by PG is a pattern-generator module (usually implemented by means of a simple FSM circuit, which, as a function of clock signal sent to its input, generates Q patterns to be used as attempt patterns and supplies them to the module 50.

The adder module 20 and the module designated by 70 calculate the differences between B(t−1) and B˜(t). There is then provided a threshold-comparator module 80 which enables new values of the logic signals designated as pat_reg, out_reg and score_reg to be loaded only when the output of the module 70 is lower than the score_reg value, i.e., when the current function B˜(t) presents a switching activity that is lower than the previous B˜(t). The reference numbers 90 designate corresponding flip-flops.

In this way, each of the registers present in the circuit controls its own enabling signal and is driven by a fast clock (clock×Q), which is Q times as fast as the bus clock.

The original architecture uses a level-one parallelism with a single circuitry of the type illustrated in FIG. 10, where Q=M!.

Obviously, if the value of M is high, the operating frequency of the module illustrated may prove critical since it imposes the need for an operating frequency that is excessively high.

The diagram of FIG. 11 illustrates an architectural solution in which a parallelism of level L=(M!)/Q is used where there are L×1000, 1001, 1002, 100(L−1) units structurally similar to the circuit diagram of FIG. 10, which operate simultaneously with different pattern sets used as attempt patterns. The output is obtained by means of a multiplexer 110 at the start of the next bus cycle. Basically, via the multiplexer 110, the output is chosen, under the control of a logic 111, that has enabled the best results to be obtained.

Albeit entailing an increase in the area occupied and in power absorption as a result of the use of a parallel structure, the solution illustrated in FIG. 11 affords the advantage of not giving rise to transmission delays at the bus-clock level and likewise makes it possible to work with a clock value clock×Q close to the effective bus-clock value.

To reduce the unnecessary activity of B(t)—which would increase the overall switching activity—, the circuit diagram of FIG. 11 can be subjected to latching, so enabling sampling at the end of the Q-th cycle of the clock signal clock×Q, from the moment when the optimal pattern is available for use.

The solution according to an embodiment of the invention is particularly suited to being used in the framework of systems of the so-called system-on-chip (SOC) systems.

The best results can be achieved in reducing the switching activity of an internal bus by exploiting the conditions in which the frequency of the bus clock is not too high and the width of the relevant bus and the length of the network is very extensive.

Basically, all the buses within the chip can undergo the sorting function described previously according to the following parameter:

$$\rho = W \cdot L / f_o$$

where $f_o$ is the frequency of the bus clock, W is the width of the bus and L is the length. Basically, the solution described can be used to particular advantage in buses for which the parameter $\rho$ appearing above has a high value.

The solution according to one embodiment of the invention can be used also in interfacing between two chips in the case where the net power consumption is considerable owing to the dissipation on the external pads, the technique described being able to reduce the power necessary for driving the external pins.

In general, both the transmitter and the receiver are programmed so as to operate with subsets of allowed patterns. This action is performed in so far as the initial values of the patterns allowed may be subject to modification with the change in the type of traffic. This operation can be performed via programming, disabling the transmitter/receiver system. After the (new) programming, the transmitter and the receiver must be re-initialized with a reset signal.

The solution according to an embodiment of the invention enables, in particular, splitting of a particularly wide bus into a plurality of identical narrow buses, by swapping the lines of one cluster according to a swapping pattern that is identical for all the clusters, so as to minimize the total switching activity. The choice of a particular test function depends, in particular, upon the effective input flow b(t) and upon the effective swapping pattern, it being on the other hand possible to achieve a reduction in the allowed patterns according to a measurement of the mean traffic. It is of particular advantage to use, in the transmission stage, an architecture of a parallel type.

It will thus be appreciated that the solution according to an embodiment of the invention is suitable for being implemented to particular advantage in the form of a computer product which can be loaded into a memory (typically, a set of registers) of a processor associated to a bus. The so-called computer product comprises portions of software code, which, when the product is run on the aforesaid processor, perform the steps of the procedure according to one embodiment of the invention.

Of course, without prejudice to the principle of the invention, the details of implementation and the embodiments may be amply varied with respect to what is described and illustrated herein, without thereby departing from the scope of the present invention, as defined in the annexed claims. This applies, in particular, to the possibility, comprised within the scope of the present invention, of building an apparatus which analyses the traffic off-line to select the best patterns. This solution appears to be at least potentially advantageous from the power-saving standpoint and also as regards the reduction in switching activity on the lines of the bus. The above advantages must, of course, be reconciled with other requirements that are to be taken into account in terms of complexity of the corresponding hardware.

For the above reason, one embodiment of the invention envisages carrying out an off-line traffic analysis performed by a processor which, prior to construction of the circuit, carries out the calculation of the corresponding performance. This may occur, for instance, using software models (for example written in C++ language) and/or with the use of hardware models (programmed, for example, in Verilog). At the circuit level, the synthesis of a circuit according to the invention indicates that the best results are achieved for bus frequencies of up to 150 MHz with reference to a 0.13-$\mu$m technology.

The above can be further improved by exploiting architectures at the maximum level of parallelism.

For instance, if all the M! patterns are used, it is possible to construct M! computing units, each of which calculates the value of switching activity using a single pattern.

The diagram of FIG. 12 illustrates a unit of this type with reference to an attempt function of the type referred to previously.

It will be appreciated that the diagram of FIG. 12 is substantially similar to the one represented in FIG. 10, with the main difference represented by the absence—in the diagram of FIG. 12—of the pattern generator PG, with the corresponding registers and the associated threshold unit.

Using M! of these submodules, the overall area occupied by the circuit as a whole increases. The main advantage of this solution is, however, represented by the fact that the unit illustrated in FIG. 12 has no need of a clock, since it is a totally combinatorial network. This means that the transmitter can reach a high frequency up to the limit imposed by the technology, thus extending the range of possible applications of the invention.

FIG. 13 refers to the scheme of a transmitter that makes use of the maximum level of parallelism, where all the M! modules (Pat0, Pat1, . . . , PatM!−1) each provide a switching-activity value of its own SA0, SA1, . . . , SAM!−1.

Just one combinatorial unit, designated by MIN, selects the lowest of these values by driving a first multiplexer MUX1 associated to the output datum B(t) and a second multiplexer MUX2 associated to the output pattern $P_t$.

The latter solution can be applied also when operating with a subset of the M! allowed patterns.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A process for transmitting data on a bus, minimizing switching activity on the bus itself, the process involving conversion of the data between a first format and a second format, said second format being used for transmission on said bus, the process comprising:

converting between said first format and said second format by swapping of position of respective bits within a cluster having a given number of bits, said swapping being implementable according to a plurality of different variants, a maximum number of said variants being equal to a factorial value of said given number, each of said variants being identified by a respective swap pattern;

selecting, among said patterns, an optimal pattern such as to minimize the switching activity at a moment of transmission of data on said bus; and transmitting said data on said bus using said second format generated using said optimal pattern.

2. The process according to claim 1, further comprising:

generating, starting from said data in said first format, a plurality of sets of data in said second format obtained using a plurality of said patterns;

detecting said switching activity at said plurality of sets of data in said second format;

selecting, starting from said plurality of sets of data in said second format, output data corresponding to said minimum switching activity; and selecting the optimal pattern as corresponding to said data with minimum switching activity.

3. The process according to claim 1, further comprising:

considering said bus, which has a total number of lines, as formed by a plurality of buses each having a number of lines which is substantially smaller than said total number; and identifying a swap pattern, said swap pattern being identical for all of said buses of said plurality.

4. The process according to claim 3, further comprising selecting said pattern identical for all the buses of said plurality as a pattern such as to produce a global minimum value of switching activity of all the buses of said plurality.

5. The process according to claim 1, further comprising identifying said optimal pattern as a data string having a given number of bits and transmitting said data string on said bus.

6. The process according to claim 5, further comprising providing additional lines on said bus for transmitting said data string identifying said optimal pattern.

7. The process according to claim 6, further comprising subjecting said data string identifying said optimal pattern to a compression operation in view of transmission on said bus.

8. The process according to claim 7 wherein said compression of said data string identifying said optimal pattern is performed with a truth table.

9. The process according to claim 5, further comprising subjecting said data string identifying said optimal pattern to processing, including processing of the bus-inverted type, in view of transmission on said bus.

10. The process according to claim 1 wherein selecting said optimal pattern includes making successive attempts at measuring switching activity between an attempt function at a given instant and a set of data in said second format detected at a previous instant in time.

11. The process according to claim 10 wherein said switching activity is measured as distance, including as Hamming distance, between said attempt function at the given instant and said set of data in said second format detected at the previous instant in time.

12. The process according to claim 11 wherein said attempt function is chosen in a group made up of:

$$B\tilde{}(t)=S(b(t), p\tilde{}); \qquad \text{I.}$$

$$B\tilde{}(t)=S(b(t), p\tilde{}) \oplus S^{-1}(b(t-1), p\tilde{}); \qquad \text{II.}$$

$$B\tilde{}(t)=S(b(t), p\tilde{}) \oplus S^{-1}(B(t-1), p\tilde{}), \qquad \text{III.}$$

wherein $B\tilde{}(t)$ is said attempt function;
wherein $b(t)$ is said first format;
wherein $B(t)$ is said second format;
wherein $P(t)$ is said swap pattern;
$S(.)$ is a swap function that generates the output data in said second format $B(t)$ as a function of said data in said first format $b(t)$ and of said pattern $(P_t)$; and
$p\tilde{}$ represents a generic attempt pattern whereby, when $p\tilde{}$ becomes an optimal attempt pattern $(P_t)$ then $B(t)=B\tilde{}(t)$.

13. A device for transmitting data on a bus, minimizing switching activity on the bus itself, the device being configured for converting the data between a first format and a second format, said second format being used for transmission on said bus, the device comprising:
at least one swap module to convert said data between said first format and said second format by swapping a position of respective bits within a given cluster having a given number of bits, said swap being implementable according to different variants, a maximum number of said variants being equal to a factorial value of said given number, each of said variants being identified by a respective swap pattern;
at least one module to identify, among said patterns, an optimal pattern such as to minimize the switching activity at a moment of transmission of the data on said bus; and
at least one transmission element to exchange said data on said bus using said second format generated using said optimal pattern.

14. The device according to claim 13, further comprising:
first circuit elements to generate, starting from said data in said first format, a plurality of sets of data in said second format obtained using a plurality of said patterns;
second circuit elements to measure said switching activity at said plurality of sets of data in said second format; and
third circuit elements to select, starting from said plurality of sets of data in said second format, output data corresponding to said minimum switching activity and to select the optimal pattern as corresponding to said data with minimum switching activity.

15. The device according to claim 13 wherein said bus, which has a total number of lines, is configured as a plurality of buses each having a number of lines which is substantially smaller than said total number, and wherein said at least one transmission element is configured to transmit said data on said plurality of buses using data in said second format generated with a swap pattern that is identical for all the buses of said plurality.

16. The device according to claim 15 wherein said pattern identical for all the buses of said plurality is a pattern such as to produce a global minimum value of switching activity on all the buses of said plurality.

17. The device according to any one of claim 13 wherein said at least one module to identify identifies said optimal pattern as a data string having a given number of bits, and wherein said at least one transmission element is configured to transmit said data string on said bus.

18. The device according to claim 17 wherein said bus includes additional lines to transmit said pattern.

19. The device according to claim 17, further comprising at least one compression module to subject said data string which expresses said optimal pattern to a compression operation in view of transmission on said bus.

20. The device according to claim 19 wherein said compression module comprises a truth table.

21. The device according claim 17, further comprising at least one processing module to subject said data string identifying said optimal pattern to processing, including processing of a bus-inverted type, in view of transmission on said bus.

22. The device according to claim 14 wherein said second and third circuit elements are configured to select said optimal pattern by making successive attempts to measure switching activity between an attempt function at a given instant and a set of data in said second format detected at a previous instant in time.

23. The device according to claim 22, further comprising a computation module to compute said activity as a Hamming distance.

24. The device according to claim 22 wherein said attempt function is chosen in a group made up of:

$$B\tilde{}(t)=S(b(t), p\tilde{}); \qquad \text{I.}$$

$$B\tilde{}(t)=S(b(t), p\tilde{}) \oplus S^{-1}(b(t-1), p\tilde{}); \qquad \text{II.}$$

$$B\tilde{}(t)=S(b(t), p\tilde{}) \oplus S^{-1}(B(t-1), p\tilde{}), \qquad \text{III.}$$

wherein $B\tilde{}(t)$ is said attempt function;
wherein $b(t)$ is said first format;
wherein $B(t)$ is said second format;
wherein $P(t)$ is said swap pattern;
$S(.)$ is a swap function that generates the output data in said second format $B(t)$ as a function of said data in said first format $b(t)$ and of said pattern $(P_t)$; and
$p\tilde{}$ represents a generic attempt pattern wherein, when $p\tilde{}$ becomes an optimal attempt pattern $(P_t)$ then $B(t)=B\tilde{}(t)$.

25. The device according to claim 17 wherein said at least one swap module and said at least one module to identify the optimal pattern are organized in a form of a plurality of units operating in parallel on said data.

26. The device according to claim 25, further comprising a plurality of computing units each of which is configured to compute a respective value of switching activity using a respective pattern.

27. The device according to claim 26 wherein said computing units of said plurality constitute a combinatorial logic network which can operate in an absence of a clock signal.

28. The device according to claim 26, further comprising a combinatorial unit configured so as to select a lowest of these values of switching activity.

29. The device according to claim 28, further comprising a first multiplexer and a second multiplexer driven by said combinatorial unit and associated, respectively, to output datum and to the output pattern.

30. The device according to claim 26 wherein said computing units of said plurality are equal in number to said variants identified by a respective pattern.

31. The device according to claim 26 wherein said computing units of said plurality are equal in number to a subset of a value of said variants identified by a respective pattern.

32. An article of manufacture usable with a processor associated to a bus, the article of manufacture comprising:
a machine-readable medium having instructions stored thereon to cause a processor to transmit data on the bus and minimize switching activity on the bus, by:
converting data between a first format to a second format usable for transmission on the bus, by swapping of position of respective bits within a cluster having a given number of bits, the swapping being implementable according to a plurality of different variants, a maximum number of the variants being equal to a factorial value of the given number, each of the variants being identified by a respective swap pattern;
selecting one of the patterns corresponding to a minimum of the switching activity at transmission of data on the bus; and
transmitting data on the bus using the second format, which is generated based on the selected pattern.

33. The article of manufacture of claim 32 wherein the machine-readable medium further has instructions stored thereon to:
generate, starting from the data in the first format, a plurality of sets of data in the second format obtained based on a plurality of the patterns;
detect the switching activity at the plurality of sets of data in the second format;
select, starting for the plurality of sets of data in the second format, output data associated with the minimum switching activity; and
select the one pattern as corresponding to the output data associated with the minimum switching activity.

34. The article of manufacture of claim 32 wherein the machine-readable medium further has instructions stored thereon to:
consider the bus, which has a total number of lines, as formed by a plurality of buses each having a number of lines that is smaller than the total number;
identify a swap pattern, the swap pattern being identical for the buses in the plurality; and
select the pattern identical for the buses as a pattern to produce a global minimum value of switching activity of all buses of the plurality of buses.

35. The article of manufacture of claim 32 wherein the machine-readable medium further includes instructions stored thereon to:
identify the one pattern as a data string having a given number of bits and transmit the data string on the bus;
provide additional lines on the bus to transmit the data string that identifies the one pattern; and
apply a compression operation to the data string that identifies the one pattern.

36. A system for transmitting data on a bus and for minimizing switching activity on the bus, the system comprising a means for converting data between a first format to a second format usable for transmission on the bus, by swapping of position of respective bits within a cluster having a given number of bits, the swapping being implementable according to a plurality of different variants, a maximum number of the variants being equal to a factorial value of the given number, each of the variants being identified by a respective swap pattern;
a means for selecting one of the patterns corresponding to a minimum of the switching activity at transmission of data on the bus; and
a means for transmitting data on the bus using the second format, which is generated based on the selected pattern.

37. The system of claim 36, further comprising:
a means for generating, starting from the data in the first format, a plurality of sets of data in the second format obtained based on a plurality of the patterns;
a means for detecting the switching activity at the plurality of sets of data in the second format;
a means for selecting, starting for the plurality of sets of data in the second format, output data associated with the minimum switching activity; and
a means for selecting the one pattern as corresponding to the output data associated with the minimum switching activity.

38. The system of claim 36, further comprising:
a means for considering the bus, which has a total number of lines, as formed by a plurality of buses each having a number of lines that is smaller than the total number;
a means for identifying a swap pattern, the swap pattern being identical for the buses in the plurality; and
a means for selecting the pattern identical for the buses as a pattern to produce a global minimum value of switching activity of all buses of the plurality of buses.

39. The system of claim 36, further comprising:
a means for identify the one pattern as a data string having a given number of bits and transmit the data string on the bus;
a means for providing additional lines on the bus to transmit the data string that identifies the one pattern; and
a means for applying a compression operation to the data string that identifies the one pattern.

40. The system of claim 36 wherein the means for selecting one of the patterns includes a means for making successive attempts at measuring switching activity between an attempt function at a given instant in time and a set of data in the second format detected at a previous instant in time, including a means for measuring the switching activity as a distance between the attempt function at the given instant and the set of data in the second format detected at the previous instant.

* * * * *